(12) United States Patent
Wasmund et al.

(10) Patent No.: US 6,746,511 B2
(45) Date of Patent: Jun. 8, 2004

(54) DECOMPOSITION METHOD FOR PRODUCING SUBMICRON PARTICLES IN A LIQUID BATH

(75) Inventors: Eric B. Wasmund, Ontario (CA); Richard S. Adams, Ontario (CA); John Ambrose, Ontario (CA); Armen Markarian, Ontario (CA); Dirk Naumann, Ontario (CA); Lloyd Timberg, Ontario (CA); Rinaldo Stefan, Ontario (CA)

(73) Assignee: Inco Limited, Toronto (CA)

( * ) Notice: Subject to any disclaimer, the term of this patent is extended or adjusted under 35 U.S.C. 154(b) by 13 days.

(21) Appl. No.: 10/188,524

(22) Filed: Jul. 3, 2002

(65) Prior Publication Data

US 2004/0003680 A1 Jan. 8, 2004

(51) Int. Cl.[7] .................................................. B22F 9/26
(52) U.S. Cl. .................................... 75/348; 75/362
(58) Field of Search .......................... 75/347, 348, 362

(56) References Cited

U.S. PATENT DOCUMENTS

| | | | |
|---|---|---|---|
| 1,138,201 A | 5/1915 | Ellis | |
| 1,759,658 A | 5/1930 | Mittasch et al. | |
| 1,759,661 A | 5/1930 | Muller et al. | |
| 3,228,882 A | 1/1966 | Harle et al. | |
| 3,504,895 A | 4/1970 | Goodrich et al. | |
| 4,252,671 A | * 2/1981 | Smith | ............... 252/430 |
| 4,808,216 A | 2/1989 | Kageyama et al. | |
| 4,915,728 A | * 4/1990 | Schell | ............... 75/347 |
| 5,064,464 A | 11/1991 | Sawada et al. | |
| 5,137,652 A | 8/1992 | Nakatani et al. | |
| 6,033,624 A | 3/2000 | Gonsalves et al. | |
| 6,365,555 B1 | 4/2002 | Moser et al. | |
| 6,428,601 B2 | * 8/2002 | Terekhov | ............... 75/362 |
| 6,506,229 B2 | 1/2003 | Wasmund et al. | ............... 75/362 |
| 2003/0017336 A1 | * 1/2003 | Gedanken et al. | ............ 428/403 |

FOREIGN PATENT DOCUMENTS

| | | |
|---|---|---|
| DE | 241823 | 1/1910 |
| WO | 02/053315 | 7/2002 |

OTHER PUBLICATIONS

The Preparation of a Ferrofluid . . . Octacarbonyl—Eugene Papirer, et al, Journal of Colloid and Interface Science, vol. 94, No. 1, Jul. 1983—pp. 220–228.
Heterogeneous Sonocatalysis with Nickel Powder, Kenneth S. Suslick, et al, Journal of the American Chemical Society, vol. 109, No. II, 1987 (3 Pgs.).
Hydrogenation of Organic Substances . . . Fuels, Carleton Ellis, Published by Van Nostrand, New York, 1930, 3rd Edition—pp. 164–167.

\* cited by examiner

*Primary Examiner*—George Wyszomierski
(74) *Attorney, Agent, or Firm*—Edward A. Steen

(57) ABSTRACT

A continuous method of manufacturing a liquid dispersion containing submicron metal or metal compound particles inside a liquid bath. A metal-containing fluid with carrier gas mixture is bubbled through the liquid bath and predetermined conditions in the bath cause the fluid to decompose to form the submicron sized metal or metal compound particles in the liquid.

30 Claims, 1 Drawing Sheet

DECOMPOSITION METHOD FOR PRODUCING SUBMICRON PARTICLES IN A LIQUID BATH

FIELD AND BACKGROUND OF THE INVENTION

The present invention relates generally to pure metal powders and metal compound powders, and in particular to a new and useful method for producing submicron metal-containing particles in a liquid bath that can be used as is, or can be further processed for other industrial purposes. Such uses include, but are not limited to, slurries and pastes for electrochemical cells such as batteries, MLCCs (multi-layer ceramic capacitors) and other types of capacitors, and metal powders for battery materials, electronics, catalysis and magnetic materials.

In 1889, Mond and Langer discovered that nickel tetracarbonyl or $Ni(CO)_4$, readily decomposes into essentially pure metallic nickel and carbon monoxide within the temperature range of about 150–315° C. A major drawback of the Mond process is that nickel tetracarbonyl is a highly dangerous toxin. Similarly, carbon monoxide must be treated with extreme care. Accordingly, few organizations throughout the world employ this method.

The multi-layer capacitor paste market requires submicron (less than one micron) nickel powders with no agglomerated particles larger than about one micron in size.

Most commercial fine nickel powders are made by chemical vapor deposition (CVD), chloride reduction or aqueous precipitation. These technologies are very expensive to scale up, however.

The resultant nickel powders used by multi-layer capacitor manufacturers are initially sold as dry powders. The fine powders are subsequently dispersed into a liquid to form a slurry which is part of the paste making process. Manufacture of the paste adds a significant cost to the final product.

For decades, the assignee here decomposed nickel tetracarbonyl vapors in the gas phase to manufacture a variety of fine pure nickel powders. Extra-fine powders, with a primary particle size of less than about 0.5 microns, may be made by gas phase decomposition of the nickel carbonyl at temperatures above about 400° C. Unfortunately, under these conditions, particle collisions create significant opportunities for sintering resulting in powders containing some undesirable particles that are in excess of one micron.

All current techniques for producing dispersions containing submicron particles require expensive multi-step batch operations to manufacture the desired slurries and pastes.

During the early development of nickel carbonyl technology around the turn of the last century, it was recognized that the passage of nickel carbonyl with hydrogen through a fluid resulted in the catalyzation and formation of organic compounds. See German patent 241,823 to Shukoff of 1911.

Similarly, U.S. Pat. No. 1,138,201 to Ellis teaches the hydrogenation of heated oils. The nickel carbonyl is utilized as a source of fine catalytic nickel within the oil. In both instances, the nickel particles are separated from the liquid leaving behind the hydrogenated compounds. Apparently there was no recognition that a subsequently treated liquid dispersion, such as a paste or slurry, with entrained nickel particles therein had any utility.

Also see C. Ellis, *Hydrogenation of Organic Substrates Including Fats and Fuels*, $3^{rd}$ Ed, Van Nostrand, N.Y. 1930, pages 164–167 which discuss the Shukoff and Ellis patents.

U.S. Pat. Nos. 1,759,658 to Mittasch et al. and 1,759,661 to Muller et al. disclose techniques for producing finely divided metals using metal carbonyls.

U.S. Pat. No. 3,504,895 discloses a process for making metal powder from carbonyl by decomposing the carbonyl in a liquid environment and recycling the non-metal products.

U.S. Pat. No. 3,228,882 discloses a process for making cobalt powders by decomposing carbonyl in a solvent having a polymer therein for encapsulization.

U.S. Pat. No. 5,137,652 discloses a method for making metal nitrides in solution by introducing ammonia into a solvent consisting of an active agent and carbonyl.

U.S. Pat. No. 6,033,624 discloses a method for producing various metals and metal alloy powders by mixing a carbonyl precursor with an alloying element in a solvent.

E. Papirer, P. Horny, et al., "The Preparation of a Ferrofluid by Decomposition of Dicobalt Octacarbonyl", *Journal of Colloid and Interface Science*, Vol. 94, No. 1, July 1983, pages 220–228, discloses a particle suspension of cobalt made by the thermal decomposition of toluene cobalt carbonyl in a solution with ethyl sodium sulfosulinate—a surfactant.

U.S. Pat. No. 4,808,216 to Kageyama et al. and U.S. Pat. No. 5,064,464 to Sawada et al. disclose the making of ultrafine magnetic metal powders by the gas-phase pyrolysis of metal carbonyl. No bubbling of a metal containing fluid through a liquid is taught or suggested.

U.S. Pat. No. 6,365,555 discloses a method of preparing metal containing compounds using hydrodynamic cavitation at elevated pressure. The effect of ultrasonic cavitation on nickel powders is also discussed in Suslick et al. "Heterogeneous Sonocatalysis with Nickel Powder," *J. of American Chem. Soc.*, 1987, Vol. 109, No. II, pages 3459–3461.

Although the cited references appear to teach the production of particles and/or colloids via liquid baths and some teach the decomposition of carbonyls using various methods, ingredients and techniques, they do not teach or suggest the present method of making a liquid dispersion with submicron metal-containing particles for pastes, slurries and other purposes.

There is a need for a continuous, cost-effective process that produces submicron metal or metal compound powders in liquid dispersions, thereby eliminating a number of intermediate processing steps.

SUMMARY OF THE INVENTION

The invention is a continuous low cost process for making a liquid dispersion of submicron sized particles of various pure metals or metal compounds.

Bubbles of a metal-containing fluid and carrier gas mixture are introduced in a liquid bath of selected composition and rheology. The bath is heated or otherwise exposed to predetermined conditions for decomposing the metal-containing fluid in the bath. The temperature that the bath is heated to varies depending on the desired properties of the particles produced, and the thermal characteristics of the liquid selected for the bath. As the bubbles rise, the metal-containing fluid decomposes into submicron metal or metal compound particles, without agglomerating while simultaneously dispersing throughout the liquid.

When nickel carbonyl vapor is the metal-containing fluid, the resultant nickel particles have an average diameter of about 0.1 microns which is an order of magnitude smaller than most current commercial nickel particles.

Accordingly, an object of the present invention is to provide a continuous method of manufacturing a liquid dispersion that includes submicron sized metal-containing particles, that comprises: establishing a bath of a selected liquid in a vessel; mixing at least one metal-containing fluid with a carrier gas to form a metal-containing fluid mixture, the metal-containing fluid being either a gas or liquid capable of decomposing under predetermined conditions in the selected liquid to form submicron sized metal-containing particles; bubbling the metal-containing fluid mixture through the selected liquid in the bath; and creating the predetermined conditions in the bath to cause at least some of the metal-containing fluid to decompose within the selected liquid in the bath to form the submicron sized metal-containing particles dispersed in the selected liquid, the selected liquid with dispersed particles having a selected rheology.

The various features of novelty which characterize the invention are pointed out with particularity in the claims annexed to and forming a part of this disclosure. For a better understanding of the invention, its operating advantages and specific objects attained by its uses, reference is made to the accompanying drawing and descriptive matter in which preferred embodiments of the invention are illustrated.

DESCRIPTION OF THE PREFERRED EMBODIMENTS

Figure 1:
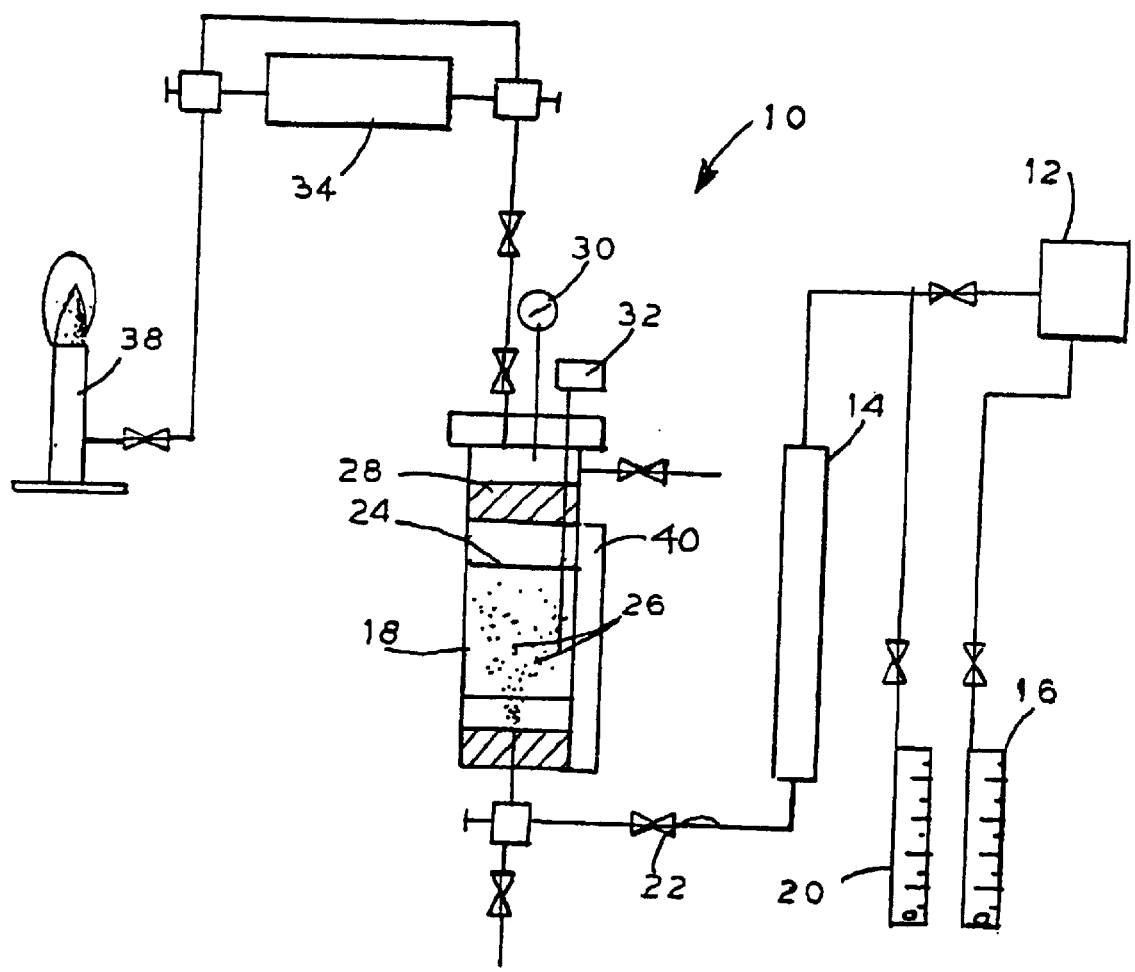
FIG. 1 is a schematic diagram of an embodiment of the invention.

Referring now to the drawing, FIG. 1 illustrates a system generally designated 10 for producing submicron metal-containing particle entrained liquid.

Although the three specific examples disclosed hereafter are directed to nickel (Ni) particles made using nickel carbonyl, those skilled in the art will understand that the method of the invention is applicable to making other metal particles and to making metal compound particles, where the metal or metal compound can form carbonyl or non-carbonyl compounds that can decompose in a selected liquid bath.

Examples of the metal include nickel (Ni), iron (Fe), cobalt (Co), chromium (Cr), molybdenum (Mo), tungsten (W), aluminum (Al), copper (Cu), gold (Au), silver (Ag), titanium (Ti), vanadium (V) and zinc (Zn), and examples of the metal compounds include oxides, sulfides, hydroxides, or carbides of these metals.

One or more of the metal-containing fluids can be used to make mixtures of the particles and the metal-containing fluids may be a gas or a liquid. For example, one or more metal carbonyls and/or one or more metal halide and/or one or more known organo-metallic CVD precursor, can be used as the metal-containing fluid for the method of the invention.

The term "metal-containing," whether applied to the metal-containing fluid or the metal-containing particles thus is meant to include both elemental or pure metals and metal compounds.

Examples of non-carbonyl compounds that can be used as the metal-containing fluid of the present invention include metal halides and the wide variety of gaseous or liquid CVD organo-metallic precursors that are know to those skilled in the art.

Chemical vapor deposition or CVD is a process in which one or several precursor compounds and reactant gases are introduced into a vacuum chamber in the vapor phase. The chamber contains the substrate upon which material is to be deposited from the vapor as a thin film. Although the precursor compound, in its original state, may be a gas, a liquid or a solid for CVD, for the present invention only metal-containing gaseous or liquid precursors would be useful. See U.S. Pat. No. 5,213,844 to Purdy, for examples of one class of CVD precursor.

"Submicron" for the present disclosure means less than about one micron.

The carrier gas for creating the metal-containing fluid mixture can be inert to the extent that the gas does not directly react with the nickel carbonyl vapors or other metal-containing fluid, or with the selected bath liquid. This carrier gas, however, may affect the speed and extent of the decomposition reaction, in accordance with standard kinetic and thermodynamic principles. Alternatively the carrier gas may participate in the reaction and thus not be inert. Examples of the carrier gas for the present invention include argon, nitrogen, helium, carbon monoxide, carbon dioxide, and mixtures thereof.

Suitable liquids for the bath are not limited to those for producing MLCC pastes but include liquids that allow decomposition to occur at higher temperature, as required when some of the non-carbonyl gases are use. Examples include decyl alcohol, low vapor pressure fluorocarbon, dodecane, alpha-terpineol, hexanol, paraffin, glycol, amines, molten salts, water, and liquid metals.

One or more dilution gas may also be used with the metal-containing fluid plus carrier gas mixture and the invention also includes the possibility of adding catalysts for enhancing the decomposition and additives for particle shape control, carried by the dilution gas or gases. Carbon monoxide, carbon dioxide and mixtures thereof are examples of the dilution gas or gases, and particle shape control can be provided by adding $H_2S$, $NH_4$, $O_2$ and/or nitric oxide and/or any of a number of commonly know organic and inorganic additives that appear in the literature.

As well as simply heating the liquid bath convectively or conductively, energy can be delivered directly to the metal-containing reactant mixture in the bubbles by techniques such as infrared, microwave, laser, induction, and ultrasonic heating. For example, when using an IR-transparent fluid in the reactor, IR energy can be coupled directly to a reactant such as Ni carbonyl contained in a bubble.

Solids may also be injected along with the gases or liquids either to act as seeds for growth or to be coated with single or multiple metal-containing layers, as well as protective or performance-enhancing coatings. This can include recycle of the very fine powders produced back into the vessel.

For example, fine Ni powder can be added to the carrier or dilution gas stream to act as seeds for particle growth. Other additives can be used to create catalyst supports, PM materials, cutting tools, and Ni-ctd Ba titanate.

The metal-containing particles that are produced may be metals, oxides, sulfides, hydroxides, or carbides as mentioned. Some particles can be produced directly in the bath in which they will be used, such as a magneto-rheological fluid, or a catalyst contained in a fluid to be applied as a coating on a reactor wall. Others are best recovered, but only after applying an organic surface coating, e.g. oleic acid. This may be accomplished by using an appropriate fluid in which to carry out the decomposition, or by post-treatment in a secondary reactor. Selection of the liquid bath thus helps establish the desired rheology of the final particle containing product where the ultimate product is the liquid dispersion of submicron particles.

Returning to the drawing, a source of gaseous nickel carbonyl or one or more other metal-containing fluids 12 is supplied to a static mixer 14 with the help of an inert carrier gas. The inert carrier gas such as carbon monoxide or any of the other carriers identified above, from supply 16, modulates the flow rate and quantity of the fluid supplied to the mixer 14 and ultimately to a reactor vessel 18 which may be an autoclave. Predetermined conditions such as heating, for causing the metal-containing fluid from 12 to decompose in reactor 18, are established by means schematically shown at 40. Means 40 symbolizes a simple heater, or an infrared, microwave, laser, induction, and/or ultrasonic heater for directly or indirectly heating the fluid in the liquid bath, to decompose the fluid and create the particles that are then automatically dispersed in the liquid.

A source of optional nitrogen or other inert dilution gas 20 as listed above, augments the $Ni(CO)_4$, or other fluid feed 12 to the vessel 18 as needed. When the carrier gas is carbon monoxide and the fluid is carbonyl, the CO serves to protect the carbonyl from decomposing prior to contact with the selected liquid 24 in the bath in reactor 18 and may affect the particle sizes. Possible liquids 24 are also listed above.

It should be apparent to those skilled in the art that due to the dangerous nature of nickel carbonyl when it is used as the metal-containing fluid, strict and appropriate safeguards must be utilized to protect operating personnel and the environment from carbonyl and carbon monoxide leakage. Accordingly, all the pumps, conduits, valves, sensors, etc. must be carbonyl rated.

The gaseous or liquid fluid and carrier gas are routed to the vessel 18 by conduit 22. It is advantageous to introduce the mixture at or near the bottom of the vessel 18 so that it will bubble at 26 up through the liquid 24 disposed within the vessel 18 where the bubbles of the mixture are subjected to the predetermined conditions, e.g. IR or laser heating, and the metal-containing fluid is caused to decompose into metal-containing particles of submicron size.

A demister 28 or similar apparatus strips any liquid from being carried over by the carbon monoxide gas flowing out of the vessel 18.

Instrumentation such as pressure gauge 30, temperature probe 32 and other processing and safety equipment (not shown) assist in regulating and controlling the process with the reactor 18.

The freed carbon monoxide or other carrier or carrier plus dilution gas that may be reactive or toxic, pass through a decomposer 34 to break down the toxic gas or other non-toxic gases. A final flame decomposer 38 both neutralizes any remaining carbon monoxide or other toxic gas and provides visual confirmation that the exhaust gas stream is within safe limits.

The submicron metal-containing particles are generated by decomposing the metal-containing fluid directly in the hot liquid disposed in the vessel 18. As the particles are formed, they are protected from surface reactions and collisions by a liquid-solid boundary layer. Simultaneously, by maintaining the liquid at a fixed uniform temperature, the resulting particles have a more uniform microstructure.

In a specific example of the method, gaseous nickel carbonyl admixed with the carrier gas enters the vessel 18 and is introduced into the heated liquid 24 via any suitable distributor known to those in the art. For example, a cooled distributor such as a nozzle, bubbler, porous disk or perforated plate allows the vapors to bubble up through the liquid 24. It is useful to cool the distributor to prevent the nickel or other metal from building up on the apparatus. By adjusting the flow rate, size distribution of the bubbles, gas concentration and the temperature of the liquid 24, the physical dimensions of the nickel particles specifically, or any other metal-containing particle, in general, may be controlled.

The inert or reactive carrier gas acts as a flow expediter.

As the gas bubbles rise through the liquid 24, the nickel carbonyl or other metal-containing fluid that can decompose, will decompose within the bubbles and/or dissolve into the liquid prior to decomposing. The decomposition of the fluid will create a liquid dispersion of submicron particles with no significant amount of agglomerated particles greater than about 1 micron. The decomposition reactions are functions of the temperature, the type of liquids selected, the gas concentration of the metal carbonyl or other compound forming the metal-containing fluid, and the fluid dynamics of the gaseous flow rate. Decomposition takes place at a pressure at which the bath fluid is maintained as a liquid.

The process is made continuous by feeding fresh quantities of the bath liquid in a controlled manner into the bottom of the reactor, while allowing the solid/liquid dispersion to overflow into or be transported into a second vessel.

The resulting solid/liquid dispersion can be thickened to the desired solids content and viscosity by any number of conventional operations such as evaporation, centrifugation, magnetic separation, and ultra-filtration.

By directly fabricating the nickel or other metal-containing particulate entrained liquid dispersion, a number of conventional preexisting processing steps for making pastes comprised of these particles are eliminated.

Three experimental trials using the system 10 demonstrate the efficacy of the present process:

EXAMPLE ONE

Two liters per minute of gaseous nitrogen (90%), nickel carbonyl (5%) and carbon monoxide (5%) were fed through a sintered disk distributor into the bottom of the vessel column 18 consisting of 350 ml of liquid heated to 160° C. at essentially atmospheric pressure. (See FIG. 1). Tests were performed in (1) decyl alcohol (CAS 112-30-1); (2) FlutecTM PPI0 low vapor pressure fluorocarbon (CAS 307-08-04); (3) silicone oil (CAS 63148-58-3); (4) dodecane (CAS 11240-3); and (5) alpha-terpineol (CAS 10482-56-1). Complete decomposition was confirmed by the color of the flame 38 during incineration in the decomposer 34. The experiment was stopped after about eight minutes after enough product was produced for evaluation. The liquid was cooled and purged at room temperature. Preliminary analysis of the microstructure by scanning electron microscope ("SEM"), dynamic light scattering and x-ray diffraction ("XRD") analysis confirmed that the bulk of the nickel particles were approximately 0.1 micron. In particular, nickel particle doped alpha-terpineol is used as capacitor electrode paste.

EXAMPLE TWO

Two liters per minute of gaseous nitrogen (90%), nickel carbonyl (5%) and carbon monoxide (5%) were fed through a sintered disk distributor into the bottom of the vessel column 18, consisting of 350 ml of heated alpha-terpineol (CAS 10482-56-1) for about eight minutes at essentially atmospheric pressure. The experiment was repeated at 120° C., 130° C., 140° C., and 160° C. It was found that no nickel powder was made at 120° C., indicating that there was no reaction or a significant build-up of nickel on the internal parts of the decomposer 34. Higher temperatures resulted in nickel particle production.

EXAMPLE THREE

One liter per minute of gaseous nitrogen (25%), nickel carbonyl (50%) and carbon monoxide (25%) was fed through a sintered tube into the bottom of the vessel column 18, consisting of 1500 ml of heated alpha-terpineol (CAS 10482-56-1), for four hours. A one liter per hour co-flow of alpha-terpineol at 60° C. was introduced upstream of the sintered tube to disengage and maintain upward flow of the gas bubbles. Ten liters per hour of alpha-terpineol at 160° C. was injected into the bottom of the vessel just downstream of the sintered tube to initiate the thermal decomposition of the rising nickel carbonyl gas bubbles. At the top of the vessel, the vapor phase was extracted and the nickel powder containing alpha-terpineol was collected in a second vessel.

While in accordance with the provisions of the statute, there is illustrated and described herein specific embodiments of the invention. Those skilled in the art will understand that changes may be made in the form of the invention covered by the claims and that certain features of the invention may sometimes be used to advantage without a corresponding use of the other features.

What is claimed is:

1. A method of manufacturing a liquid dispersion that includes about 0.1 micron sized pure discrete metal-containing particles, the method comprising the steps of:
   providing a bath of a selected liquid in a vessel;
   mixing at least one metal-containing fluid with a carrier gas to form a metal-containing fluid mixture, the metal-containing fluid being capable of decomposing under predetermined conditions in the selected liquid to form pure discrete metal-containing particles;
   bubbling the metal-containing fluid mixture through the selected liquid in the bath; and
   establishing the predetermined conditions in the bath to cause at least some of the metal-containing fluid to decompose within the selected liquid in the bath to form the pure discrete metal-containing particles dispersed in the selected liquid.

2. A method according to claim 1, including adjusting the rheology of the liquid dispersion.

3. A method according to claim 1, including adjusting the rheology by thickening the liquid dispersion to a selected solids content.

4. A method according to claim 1, including adjusting the rheology by subjecting the liquid dispersion to at least one of: evaporation; centrifugation; magnetic separation; and ultra-filtration.

5. A method according to claim 1, including adding a dilution gas to the mixture in addition to the carrier gas.

6. A method according to claim 5, including adding at least one solid to the dilution gas to modify surface and physical characteristics of the particles or to become coated with layers of metal.

7. A method according to claim 1, wherein the predetermined conditions for the bath include convective or conductive heating of the bath to an extent required to decompose at least some of the metal-containing fluid.

8. A method according to claim 7, wherein the bath is maintained at a pressure at which the bath fluid is in a liquid state.

9. A method according to claim 7, wherein the heating is performed using at least one of infrared, microwave, laser, induction, and ultrasonic heating.

10. A method according to claim 1, wherein the metal-containing fluid is selected from the group consisting of either gaseous or liquid carbonyl, halide or organo-metallic CVD precursor.

11. A method according to claim 1, wherein the metal-containing fluid is a compound of at least one of the group consisting of nickel, iron, cobalt, chromium, molybdenum, tungsten, aluminum, copper, gold, silver, titanium, vanadium and zinc, and oxides, sulfides, hydroxides, and carbides thereof.

12. A method according to claim 1, wherein the carrier gas is selected from the group consisting of argon, nitrogen, helium, carbon monoxide, carbon dioxide, and mixtures thereof.

13. A method according to claim 12, including adding a dilution gas to the mixture in addition to the carrier gas, the dilution gas being selected from the group consisting of carbon monoxide, carbon dioxide and mixtures thereof.

14. A method according to claim 1, including adding to the carrier gas a reaction catalyst and particle shape control substance.

15. A method according to claim 14, wherein the shape control substance is at least one of $H_2S$, $NH_4$, $O_2$ and nitric oxide.

16. A method according to claim 1, wherein the selected liquid for the bath is at least one of decyl alcohol, low vapor pressure fluorocarbon, dodecane, alpha-terpineol, hexanol, paraffin, glycol, amines, molten salts, water, and liquid metal.

17. A method for producing a liquid dispersion containing pure discrete metal particles of about 0.1 microns in size, the method comprising:
   providing a liquid bath in a vessel;
   mixing a metal-carbonyl gas with an inert carrier gas to form a metal-carbonyl gas mixture;
   introducing the metal-carbonyl gas mixture into the liquid bath;
   bubbling the metal-carbonyl gas mixture through the liquid bath;
   causing at least a portion of the metal-carbonyl gas to decompose within the liquid bath to form pure discrete metal particles of about 0.1 microns in size, and remain therein; and
   forming the liquid dispersion of the pure discrete metal particles in the liquid bath with a predetermined viscosity.

18. The method according to claim 17, wherein the liquid bath is heated.

19. The method according to claim 18, wherein the liquid bath is heated in excess of about 1200° C.

20. The method according to claim 17, wherein the metal-carbonyl gas is selected from the group consisting of nickel carbonyl, iron carbonyl, cobalt carbonyl, chromium carbonyl, and molybdenum carbonyl.

21. The method according to claim 17, wherein the size of at least most of the metal particles is less than about 1 micron.

22. The method according to claim 17, wherein the liquid bath is selected from the group consisting of decyl alcohol, low vapor pressure fluorocarbon, dodecane, and alpha-terpineol.

23. The method according to claim 17, wherein the liquid dispersion of metal particles is thickened.

24. The method according to claim 23, wherein the liquid dispersion of metal particles is thickened by a method selected from the group consisting of evaporation, centrifugation, magnetic separation and ultra-filtration.

25. The method according to claim 17, wherein the liquid dispersion is a slurry or paste.

26. The method according to claim 17, wherein the inert carrier gas is carbon monoxide.

27. The method according to claim 17, wherein a dilution gas is added to the metal-carbonyl gas mixture.

28. The method according to claim 27, including introducing about 90% dilution gas, about 5% metal-carbonyl gas and about 5% carbon monoxide to the liquid bath.

29. The method according to claim 27, wherein the dilution gas is nitrogen.

30. The method according to claim 27, including introducing about 90% nitrogen, about 5% nickel carbonyl gas and about 5% carbon monoxide to the liquid bath.

* * * * *